(12) United States Patent
Sohn et al.

(10) Patent No.: US 10,614,693 B2
(45) Date of Patent: Apr. 7, 2020

(54) DANGEROUS SITUATION NOTIFICATION APPARATUS AND METHOD

(71) Applicant: ELECTRONICS AND TELECOMMUNICATIONS RESEARCH INSTITUTE, Daejeon (KR)

(72) Inventors: Jong Moo Sohn, Daejeon (KR); Moo Seop Kim, Sejong-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/374,857

(22) Filed: Apr. 4, 2019

(65) Prior Publication Data
US 2019/0311597 A1 Oct. 10, 2019

(30) Foreign Application Priority Data
Apr. 10, 2018 (KR) .................. 10-2018-0041741

(51) Int. Cl.
*G08B 23/00* (2006.01)
*G08B 21/04* (2006.01)
(Continued)

(52) U.S. Cl.
CPC ............ *G08B 21/043* (2013.01); *G06F 3/011* (2013.01); *G06F 3/017* (2013.01); *G06N 5/04* (2013.01); *G08B 21/0469* (2013.01)

(58) Field of Classification Search
CPC .. G08B 21/043; G08B 21/0469; G08B 23/00; G06F 3/011; G06F 3/017; G06N 5/04
See application file for complete search history.

(56) References Cited

U.S. PATENT DOCUMENTS 6,028,514 A * 2/2000 Lemelson .......... G08B 21/0211
340/539.13
9,811,998 B2 * 11/2017 Singh .................... G06F 3/0416
(Continued)

FOREIGN PATENT DOCUMENTS

KR 10-1367964 B1 3/2014
KR 10-1598466 B1 2/2016
(Continued)

*Primary Examiner* — Phung Nguyen
(74) *Attorney, Agent, or Firm* — LRK Patent Law Firm

(57) ABSTRACT

A dangerous situation notification apparatus includes an acoustic information management unit identifying and providing acoustic information including an acoustic source type and acoustic scene information; a user behavior information identification unit generating and providing user behavior information; a behavior context information management unit storing user behavior context information generated using the acoustic information and the user behavior information in advance, and analyzing user's current behavior context information corresponding to the acoustic information and the user behavior information detected in real time; a dangerous situation inference unit inferring whether the acoustic information or the user behavior information corresponds to a dangerous situation; and a dangerous situation notification unit providing a dangerous situation notification.

16 Claims, 5 Drawing Sheets

(51) Int. Cl.
   *G06F 3/01*      (2006.01)
   *G06N 5/04*      (2006.01)

(56) References Cited

U.S. PATENT DOCUMENTS

| | | | |
|---|---|---|---|
| 10,102,732 B2 * | 10/2018 | Gersten | G08B 25/10 |
| 2010/0145695 A1 | 6/2010 | Jung et al. | |
| 2012/0308971 A1 * | 12/2012 | Shin | G08B 31/00 |
| | | | 434/236 |
| 2016/0157032 A1 * | 6/2016 | Kane | H04R 3/00 |
| | | | 381/56 |

FOREIGN PATENT DOCUMENTS

| | | |
|---|---|---|
| KR | 10-2016-0054397 A | 5/2016 |
| KR | 10-1672947 B1 | 11/2016 |

\* cited by examiner

DANGEROUS SITUATION NOTIFICATION APPARATUS AND METHOD

CROSS REFERENCE TO RELATED APPLICATION

The present application claims priority to Korean Patent Application No. 10-2018-0041741, filed Apr. 10, 2018, the entire content of which is incorporated herein for all purposes by this reference.

BACKGROUND OF THE INVENTION

1. Field of the Invention

The present invention relates generally to an apparatus and a method for providing a warning notification of a dangerous situation and, more particularly, to an apparatus and a method for providing a warning notification of a dangerous situation in accordance with a user's current behavior context.

2. Description of Related Art

In the case of users who have a limited sense of sound, such as earphone-wearing pedestrians, the deaf, the aged, etc., the sound generated by the surroundings of the user may not be perceived in time. This makes the user impossible to recognize the danger signal that may be detected through the sound, and it is highly likely that such user may be involved in dangerous situation or get into an accident.

Accordingly, various methods for solving or mitigating a problem of deteriorated perception due to the lack of acoustic information have been researched.

SUMMARY OF THE INVENTION

A user may live a daily life while carrying or using a portable terminal, thus it is possible to find the behavior pattern of the user by using information obtained from the portable terminal or the like, and predict the current state of the user or infer behaviors to be performed by the user on the basis of information obtained in real time from the portable terminal or the like.

It is an object of the present disclosure to provide dangerous situation notification apparatus and method capable of accurately predicting a dangerous situation and notifying a user of the dangerous situation by performing overall analysis on the ambient sound and the behavior information of the user.

Another technical problem of the present disclosure is to provide dangerous situation notification apparatus and method capable of predicting a dangerous situation and notifying a user of the dangerous situation on the basis of the user's current behavior context derived from the past behavior pattern and the current behavior information of the user.

The technical objects to be achieved by the present disclosure are not limited to the above-mentioned technical subjects, and other technical subjects which are not mentioned are to be clearly understood from the following description to those skilled in the art.

In order to achieve the above objects, a dangerous situation notification apparatus according to an embodiment of the present disclosure includes an acoustic information management unit identifying and providing acoustic information including an acoustic source type and acoustic scene information; a user behavior information identification unit generating and providing user behavior information on the basis of at least one of terminal usage information of a user, sensing information of a user terminal, and ambience information of the user terminal; a behavior context information management unit storing user behavior context information generated using the acoustic information and the user behavior information in advance, and analyzing user's current behavior context information corresponding to the acoustic information and the user behavior information detected in real time on the basis of the user behavior context information stored in advance; a dangerous situation inference unit inferring whether the acoustic information or the user behavior information corresponds to a dangerous situation on the basis of the user's current behavior context information; and a dangerous situation notification unit providing a dangerous situation notification on the basis of a result inferred by the dangerous situation inference unit.

In addition, a dangerous situation notification method according to another embodiment of the present includes identifying acoustic information including an acoustic source type and acoustic scene information; generating user behavior information on the basis of at least one of terminal usage information of a user, sensing information of a user terminal, and ambience information of the user terminal; generating and storing user behavior context information in advance using the acoustic information and the user behavior information; analyzing user's current behavior context information corresponding to the acoustic information and the user behavior information detected in real time on the basis of the user behavior context information stored in advance; inferring whether the acoustic information or the user behavior information corresponds to a dangerous situation on the basis of the user's current behavior context information; and providing a dangerous situation notification on the basis of a result inferred by the dangerous situation inference unit.

The features briefly summarized above for this disclosure are only exemplary aspects of the detailed description of the disclosure which follow, and are not intended to limit the scope of the disclosure.

According to the present disclosure, it is possible to provide dangerous situation notification apparatus and method capable of more accurately predicting a dangerous situation and notifying a user of the dangerous situation by performing overall analysis on the ambient sound and the behavior information of the user.

Also, according to the present disclosure, there can be provided a dangerous situation notification apparatus and method capable of more accurately predicting a dangerous situation and notifying a user of the dangerous situation on the basis of the user's current behavior context derived from the past behavior pattern and the current behavior information of the user.

The effects obtainable from the present disclosure are not limited to the effects mentioned above, and other effects not mentioned can be clearly understood by those skilled in the art from the description below.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
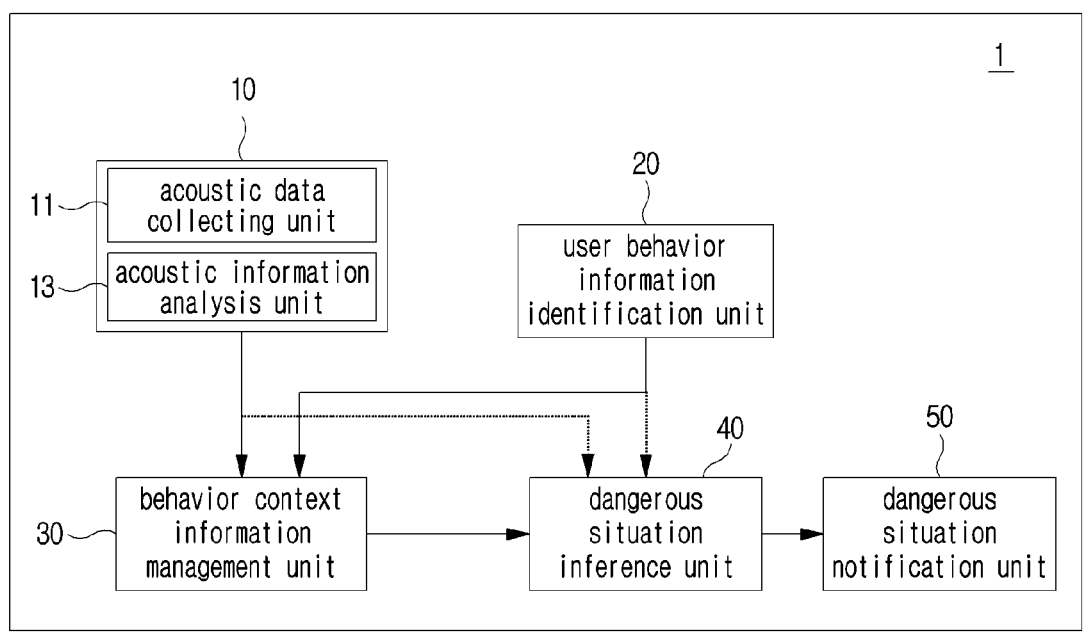
FIG. 1 is a block diagram illustrating a configuration of a dangerous situation notification apparatus according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinbelow, embodiments of the present invention will be described referring to the accompanying drawings.

FIG. 1 is a block diagram showing a configuration of a dangerous situation notification apparatus according to an embodiment of the present disclosure.

Referring to FIG. 1, the dangerous situation notification apparatus 1 includes an acoustic information management unit 10, a user behavior information identification unit 20, a behavior context information management unit 30, a dangerous situation inference unit 40, and a dangerous situation notification unit 50.

The acoustic information management unit 10 may include an acoustic data collecting unit 11 and an acoustic information analysis unit 13.

The acoustic data collecting unit 11 may include at least one microphone for collecting ambient acoustic data generated by objects around the dangerous situation notification apparatus 1.

Occurrence of the dangerous situation may be related to a sound source. That is, a cause of the dangerous situation may generate certain acoustic sound, or an acoustic sound may be generated as a result of the dangerous situation. In view of this, the acoustic information analysis unit 13 may extract at least one sound source from the collected acoustic data, and determine acoustic source types on the basis of the characteristics represented by the sound sources. For example, the acoustic source types may include animal barking, gun fire, human scream, baby crying, a car, a bus, a truck, a motorcycle, a train, an engine acceleration, a horn, a sudden stopping sound of a vehicle, a door knock, a phone bell, a doorbell, various warnings (alarms), a siren, and the like.

Also, the acoustic information analysis unit 13 may calculate relative position information between at least one sound source and the dangerous situation notification apparatus 1, for example, relative distance information indicating a distance between at least one sound source and the dangerous situation notification apparatus 1, direction information indicating a direction of at least one sound source on the basis of the orientation of dangerous situation notification apparatus 1, and the like. For example, the acoustic information analysis unit 13 may calculate relative distance information, direction information, and the like by using geometric arrangement information of the at least two microphones, a phase difference of the acoustic signals received by the at least two microphones, a change in frequency component, and the like.

In addition, the acoustic information analysis unit 13 may generate acoustic scene information based on acoustic source types or characteristics represented by the sound source. The acoustic scene information may imply an audibly perceived location or place of the dangerous situation notification apparatus 1. For example, the acoustic scene information may include a bus, a city, a square, a house, a subway, an office, a residential area, a train station, and the like.

Further, the acoustic information analysis unit 13 performs quality enhancement (white noise removal, sound pressure normalization, etc.) on the collected acoustic data, extracts features in the time-frequency domain, and analyzes the extracted features, thereby detecting or classifying the acoustic source types and the acoustic scene information.

For example, the acoustic information analysis unit 13 extracts Mel-frequency cepstral coefficients (MFCC) as a characteristic of an acoustic signal, and detects or classifies the acoustic source types and the acoustic scene information using a classifier, such as Bayesian, k nearest neighbor (kNN), support vector machine (SVM), hidden Markov chain model (HMM), decision tree, and multi-layer perceptron neural network (MLP NN).

As another example, the acoustic information analysis unit 13 learns acoustic signals with arbitrary time and frequency domain features directly through deep-learning, and detects or classifies the acoustic source types and the acoustic scene information using the learned network. Herein, the deep learning is performed using a model based on a network structure such as a deep neural network (DNN), a convolutional neural network (CNN), a recurrent neural network (RNN), a restricted Boltzmann machine (RBM), and a deep belief network (DBM), and the like.

Although a method in which the acoustic information management unit recognizes the acoustic source types and the scene information is exemplified according to an embodiment of the present invention, the present disclosure is not limited thereto and may be variously changed.

On the other hand, the user behavior information identification unit 20 detects terminal usage information of the user, sensing information of the user terminal, ambience information of the user terminal, and the like, and generates user behavior information on the basis of at least one of the terminal usage information of the user, the sensed data from the user terminal, the ambience information of the user terminal. Herein, the 'user behavior information' is information that is sensed or measured with devices worn or carried by a user, and may include factors that are influenced by and changed with the user's behavior.

The terminal usage information of the user is information indicating the terminal operation in which a user's usage intention is reflected. The terminal usage information may be detected based on the operation of the application stored in the user terminal or the state of the input/output interface (e.g., volume level, keyboard input screen, and the like) provided in the user terminal. For example, the user behavior information identification unit 20 may confirm that the user is conducting a 'phone call' when a phone application is in operation, conducting 'music playback' when a music playback application is in operation, conducting 'video playback' when a video playback application is in operation, and conducting 'searching' when the web searching application is in operation. Also, the user behavior information identification unit 20 may identify a 'screen watching' state of the user on the basis of an on or off state of the display, identify a 'hearing restriction' state on the basis of whether an earphone or a speaker is connected or not, and identify a 'typing' state on the basis of the keyboard input.

The sensing information of the user terminal may include information detected from at least one sensor provided in the dangerous situation notification apparatus 1 or in the wearable device connected to the dangerous situation notification apparatus 1. The sensing information of the user terminal may include a heart rate sensor value, a motion sensor value (acceleration, angular velocity, temperature, altitude, etc.), and position and movement information (GPS coordinates, indoor position coordinates, moving speed, and the like).

The ambience information of the user terminal includes location information (address, building name, store name, etc.) detected based on the geographical location information of the dangerous situation notification apparatus 1, weather information corresponding to the region where the dangerous situation notification apparatus 1 is located, and the like.

The user behavior information identification unit 20 may also detect and store temporal information (e.g., date, day of the week, time of day, etc.) along with the above information, i.e., the terminal usage information of the user, the sensing information of the user terminal, and the like.

The behavior context information management unit 30 may manage behavior context information on the basis of the acoustic information and the user behavior information. Here, the behavior context information may include a behavior context element and a behavior context entity. The behavior context element may be information detected based on the meaning implied in the acoustic information and the user behavior information, and the behavior context entity may be information defined by a combination of the behavior context elements.

Specifically, the behavior context element may represent an intention of a user implied in a specific activity performed by the user, and may include information about 'why' the user performs a specific activity ('what'). Based on this, the behavior context information management unit 30 may interprets a user behavior information termed 'moving on foot' as a behavior context element such as 'going to work', 'leaving work', and 'exercising', and the like, in consideration of a place where the user begins to walk, a semantic time related to the behavior, repetitive pattern of the same behavior, and the like, regarding the user behavior information.

In addition, the behavior context entity may be information describing a user's behavior in detail by combining a series of user behavior context elements and information such as time and place. For example, the user behavior context entity may be exemplified as 'moving on foot for lunch on weekdays', 'moving by car for exercising on a weekend morning', 'commute to work by bicycle for night duty on a weekday evening', and so on. The user behavior context entities are information including the user's behavior context element and data based thereon and may include information such as date, day of the week, time of the day, transport type, location, place, speed, direction, activity, and the like.

Furthermore, since the behavior context element and the behavior context entity may be different for each user, the behavior context information management unit 30 may generate and store the behavior context element and the behavior context entity for each user.

As described above, the behavior context information management unit 30 may manage behavior context information. Further the behavior information management unit 30 may identify user acoustic information and user behavior information collected in real time and detect behavior context elements corresponding thereto. The behavior context information management unit 30 may identify the behavior context entity corresponding to the detected behavior context element in real time. In this way, the behavior context information management unit 30 may detect the behavior context element and the behavior context entity corresponding to the user acoustic information and the user behavior information collected in real time, and provide the detected information to the dangerous situation inference unit 40.

In order for the behavior context information management unit 30 to distinguish the behavior context elements and the behavior context entities stored in the database from the behavior context elements and the behavior context entities corresponding to user acoustic information and user behavior information collected in real time, the behavior context element and the behavior context entity corresponding to the user acoustic information and the user behavior information collected in real time are indicated as the current behavior context element and the current behavior context entity. On the other hand, the dangerous situation inference unit 40 may infer whether or not the acoustic information and the user behavior information correspond to a dangerous situation on the basis of the current behavior context element and the current behavior context entity analyzed by the behavior context information management unit 30 at the current time.

Specifically, the dangerous situation inference unit 40 may determine whether an acoustic source type input in real time corresponds to a risk factor on the basis of the current behavior context element or entity of the user.

For example, when the acoustic source type corresponds to a risk factor such as sirens, alarms, warnings, horns, and the like, the dangerous situation inference unit 40 may determine whether the acoustic source type has to be considered in the current behavior context element or the current behavior context entity of the user. The dangerous situation inference unit 40 may infer whether or not a dangerous situation occurs, only when the acoustic source type is suitable for the current behavior context element or the current behavior context entity of the user. For example, the dangerous situation inference unit 40 may infer a dangerous situation differently according to the current behavior context element or the current behavior context entity of the user, when sensing that the user is walking on a specific place and the acoustic source type is a fire alarm. For example, when the current behavior context element is 'commute to work', the user is more likely to pass the place, so the dangerous situation inference unit 40 may infer that the situation is 'not dangerous' on the basis of the current behavior context element. On the other hand, when the current behavior context element is 'shopping', the user is likely to wander around the place or enter a building, so the dangerous situation inference unit 40 may infer that the situation is 'dangerous' on the basis of the current behavior context element.

As another example, when an acoustic source type corresponds to a risk factor such as a siren, an alarm, a warning, a horn, and the like and the sound occurs continuously, the dangerous situation inference unit 40 may identify the position or trajectory of a sound source and identify a user's trajectory from the current behavior context element or the current behavior context entity of the user. The dangerous situation inference unit 40 may determine whether or not a dangerous situation occurs by calculating a likelihood of the user's collision with the sound source using the locations and trajectories of the sound source and the user.

Further, the dangerous situation inference unit 40 may calculate a distraction level of the user using the current behavior context element or the current behavior context entity of the user and the user behavior information, and use the distraction level as a sensitivity adjustment parameter of the dangerous situation prediction. For example, the dangerous situation inference unit 40 sets the distraction level to 'normal' if the unit confirms that the user terminal is being moved using the sensing information of the user terminal, an earphone is connected using the sensing information of the user terminal, a music playback application is in operation using the terminal usage information of the user, and the display of the user terminal is off. If the distraction level is set to 'normal', the dangerous situation inference unit 40 may use acoustic source types of the sound sources located in the predetermined first region to determine whether or not a dangerous situation occurs. As another example, the dangerous situation inference unit 40 sets the distraction level to 'high' if the unit confirms that the user terminal is being moved using the sensing information of the user terminal, an earphone is connected using the sensing information of the user terminal, a moving picture playback application is in operation using the terminal usage information of the user, and the display of the user terminal is on. If the distraction level is set to 'high', the dangerous situation inference unit 40 may use acoustic source types of the sound sources located in the second region wider than the predetermined first region to determine whether or not a dangerous situation occurs.

The manner in which the dangerous situation inference unit 40 infers the dangerous situation may be performed based on a combination of at least one rule-based logic algorithm (IF This Then That (IFTTT), ontology, etc.). In another example, the dangerous situation inference unit 40 may perform inference on the dangerous situation using a predictor implemented by machine learning (DNN, CNN, RNN, RBN, DBM, etc.) using collected data for a predetermined period of time.

When the dangerous situation is inferred to occur, the dangerous situation inference unit 40 may provide the resulting to the dangerous situation notification unit 50. Accordingly, the dangerous situation notification unit 50 may notify a user of the dangerous situation through at least one mean, for example, sound, vibration, visual message, and the like, that may be recognized by the user.

Further, the dangerous situation notification unit 50 may notify the user of the dangerous situation in consideration of the terminal usage information of the user. For example, when the terminal usage information of the user indicates that the moving picture is being played, a voice message notifying the user of occurrence of the dangerous situation may be played, or a pop-up message notifying the user of occurrence of the dangerous situation may be displayed. When the terminal usage information of the user indicates that the sound source file is being played, a voice message notifying the user of occurrence of the dangerous situation may be played, or vibration of the terminal may be generated.

Figure 2:
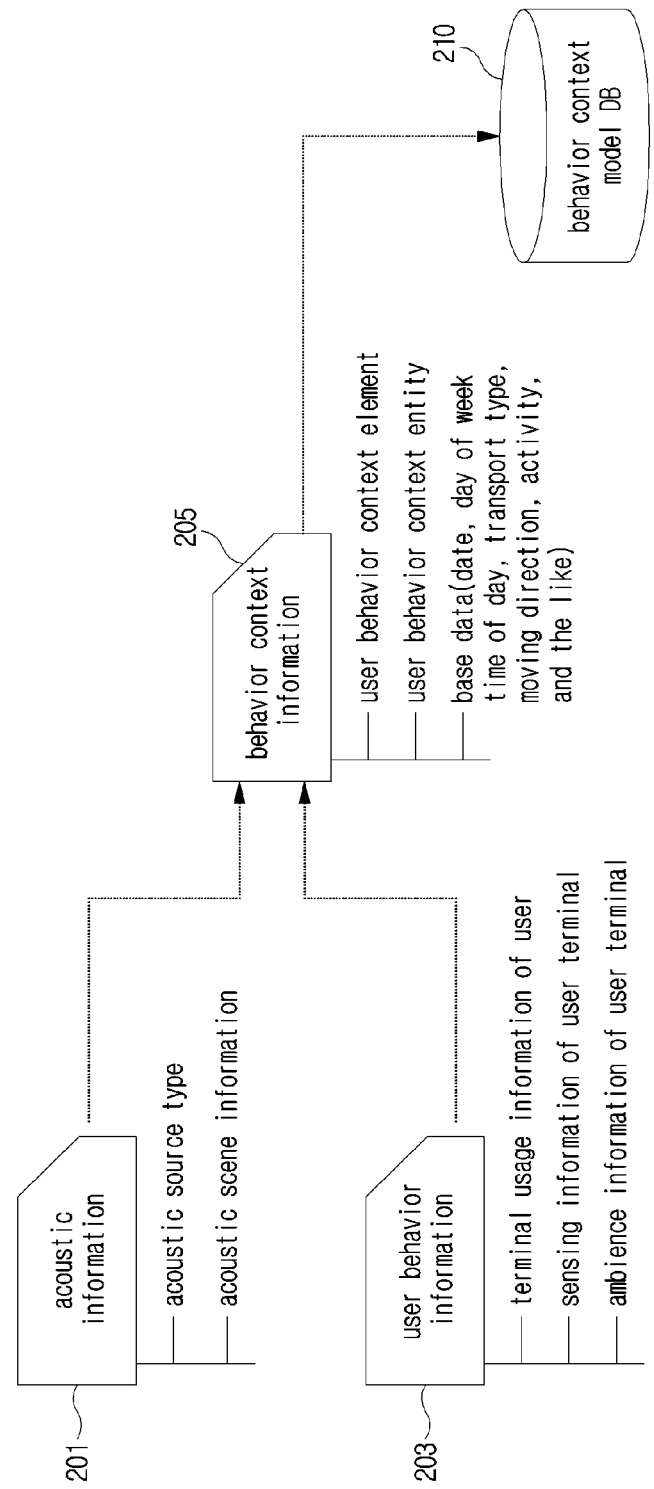
FIG. 2 is a diagram illustrating a relationship between acoustic information, user behavior information, and behavior context information used in a dangerous situation notification apparatus according to an embodiment of the present disclosure.

FIG. 2 is a diagram illustrating a relationship between acoustic information, user behavior information, and behavior context information used in a dangerous situation notification apparatus according to an embodiment of the present disclosure.

Referring to FIG. 2, the acoustic information 201 may include acoustic source types, acoustic scene information, etc., and the user behavior information 203 may include terminal usage information of the user, sensing information of the user terminal, ambient information of the user terminal, and the like.

Meanwhile, the behavior context information 205 may be generated through analysis of the acoustic information 201 and the user behavior information 203. In particular, the behavior context information 205 may be generated through temporal pattern analysis of the acoustic information 201 and the user behavior information 203, and semantic analysis of patterns. The behavior context information 205 may include a user behavior context element, a user behavior context entity, and the like, and may also include information such as date, day of the week, time of the day, transport type, location, speed, direction, activity, and the like, as underlying data.

Further, the behavior context information 205 may be stored in the behavior context model DB 210 and used to infer a dangerous situation.

Figure 3:
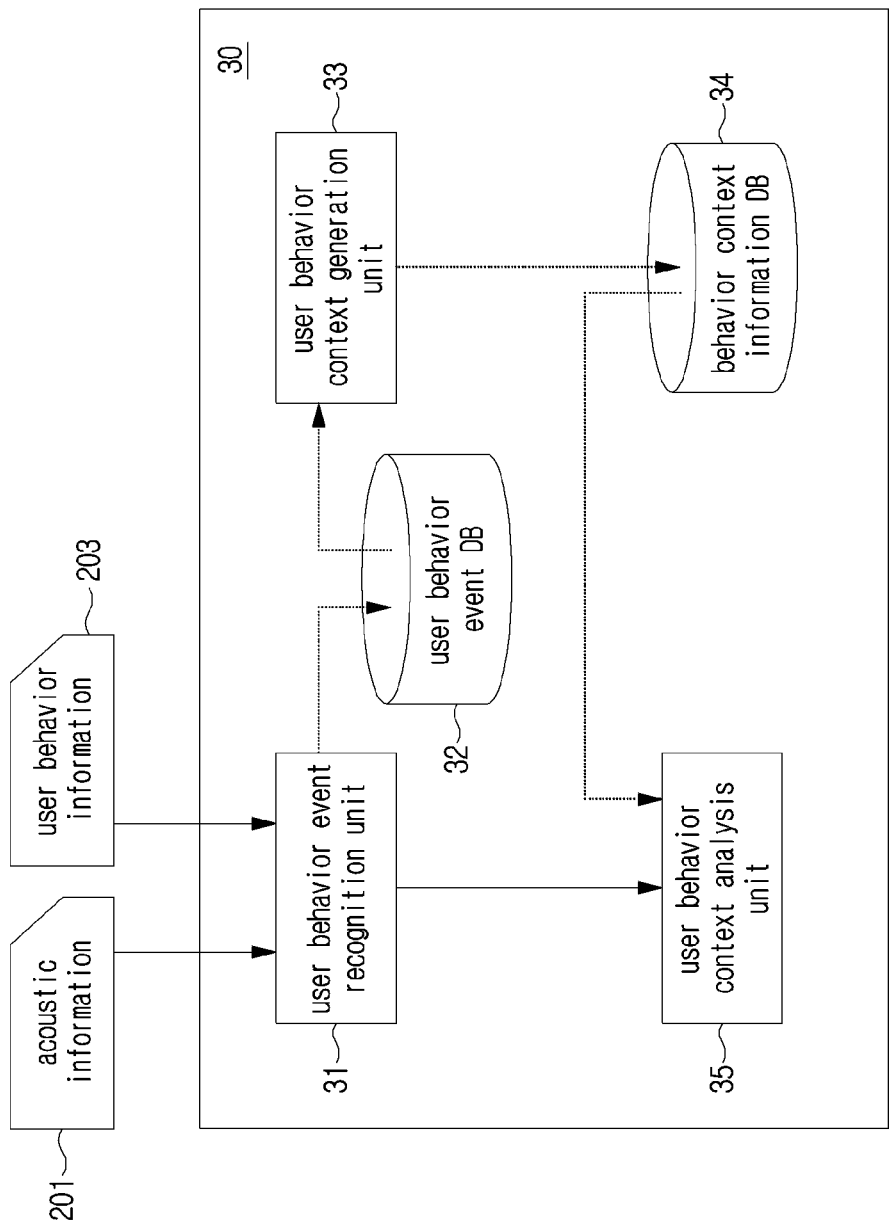
FIG. 3 is a block diagram illustrating a detailed configuration of a behavior context information management unit provided in a dangerous situation notification apparatus according to an embodiment of the present disclosure.

FIG. 3 is a block diagram showing a detailed configuration of a behavior context information management unit provided in a dangerous situation notification apparatus according to an embodiment of the present disclosure Referring to FIG. 3, the behavior context information management unit 30 recognizes user behavior events corresponding to individual contextual cues embedded in the user behavior using the acoustic information 201 and the user behavior information 203, and then infer the behavior context element and the behavior context entity specific to the user from the temporal and spatial continuity and periodicity of the user behavior events. To this end, the behavior context information management unit 30 may include a user behavior event recognition unit 31, a user behavior context generation unit 33, and a user behavior context analysis unit 35.

The user behavior event recognition unit 31 may extract a behavior event from the acoustic information 201 and user behavior information 203. Here, the behavior event may include a transport type, activity, location, and place of the user.

For example, the user behavior event recognition unit 31 may recognize the transport type and activities (e.g., stop, vehicle, bike, run, walk, exercise, etc.) of the user using movements of user terminal represented by changes in the acceleration and angular velocity included in the user behavior information 203 and position information represented by a GPS signal reception state and a coordinate.

In addition, the user behavior event recognition unit 31 may recognize the transport type and the activity by using a typical classifier implementation method, for example, Bayesian, kNN, SVM, HMM, decision tree, MLP NN, deep learning, and the like.

In addition, the user behavior event recognition unit 31 recognizes the current place by combining information (e.g., GPS coordinate, indoor position coordinate, address, and surrounding place) related to the acoustic scene information and the location and place included in the user behavior information 203, where the current location information may include an outdoor GPS coordinate, an indoor location coordinate, a type of the place, address, indoor or outdoor, and the like.

Further, the user behavior event recognition unit 31 may store temporal information corresponding to the recognized behavior event in the user behavior event DB 32. The temporal information may include an event occurrence and start/end time, where each time may also include date, time of the day, day of the week, and the like.

The user behavior context generation unit 33 combines and analyzes a behavior event stored in the user behavior event DB 32 to generate user behavior context elements. For example, the user behavior context generation unit 33 analyzes the continuity and periodicity of time and/or space of the behavior events that show the user's personal behavior pattern. Specifically, it is possible to distinguish 'home' from 'work', 'work days' and 'holidays', and the like by detecting the stationary time at a specific location/place during a day. It is also possible to infer commute time, working mode (day duty, night duty), commuting mode, etc., from repetitive patterns of movements between 'home' and 'work' on weekdays, and infer behavior pattern such as 'walking', 'sports activities', 'shopping', and 'eating out' by analyzing times and places to the user visited in their off-duty time.

The user behavior context generation unit 33 may use at least one of an arbitrary algorithm, machine learning, deep learning, reinforcement learning, and rule-based reasoning methods in order to generate a behavior context element of a user.

For example, the user behavior context generation unit 33 extracts user's major stationary locations from the user locations (GPS coordinate, indoor location coordinate, indoor spatial information), then uses an arbitrary algorithm to assign the indoor/outdoor, address, and type of place (residence, schools, etc.) to each major stationary location, then uses rule-based reasoning (e.g., ontology, IFTTT, etc.) to assign the contextual meaning (home, work, etc.) to each major stationary location.

As another example, the user behavior context generation unit 33 may perform learning (machine learning, deep learning, reinforcement learning, etc.) on changes in locations and transport types throughout the day in order to classify working day, holiday, working mode (day duty, night duty), and the like, and determine the user's working day, holiday, working mode (day duty, night duty), and the like using the learned information.

The user behavior context generation unit 33 may use at least one method of the arbitrary algorithm or the rule-based reasoning methods on normalized data such as a day of the week, whether user commutes or not, and a visiting place pattern, to determine working day, holiday, working mode (day duty, night duty), and the like.

The user behavior context generation unit 33 may store the user behavior context element and the user behavior event information based thereon in the behavior context information DB 34 as behavior context elements.

In addition, the user behavior context generation unit 33 may configure information describing the user's behavior in detail including time and place by combining the user behavior context element, and store the information in the behavior context information DB 34 as a user behavior context entity. For example, the user behavior context entity may be described in human readable form as 'moving on foot for lunch on weekdays', 'moving by car for exercising on a weekend morning', 'commute to work by bicycle for night duty on a weekday evening', and so on.

The user behavior context analysis unit 35 may compare the user behavior event (e.g., transport type, activity, location, etc.) at the current point in time (date, a day of the week, time of the day, etc.) with the behavior context element or the behavior content entity (i.e., user behavior context element or the user behavior content entity built based on the past user behavior event) of the user, which is stored in the behavior context information DB 34, thereby determining the current behavior context element or behavior content entity corresponding to the user behavior event occurring at the current point in time. For example, only information that may be obtained from the user behavior event is 'the user is moving on foot on a specific place, on a specific date, at a specific time, at a specific place'. However, if a behavior context entity such as 'shopping at a shopping mall on weekend' is generated and stored in the behavior context information DB 34 from the past repetitive behavior events of the user, and the behavior context entity has common features with the current time and place, i.e. the day of a week and the place, the user behavior context analysis unit 35 may infer the current behavior context entity as 'moving on foot for shopping at shopping mall on a weekend afternoon' for the user behavior event occurring at the current point in time.

Figure 4:
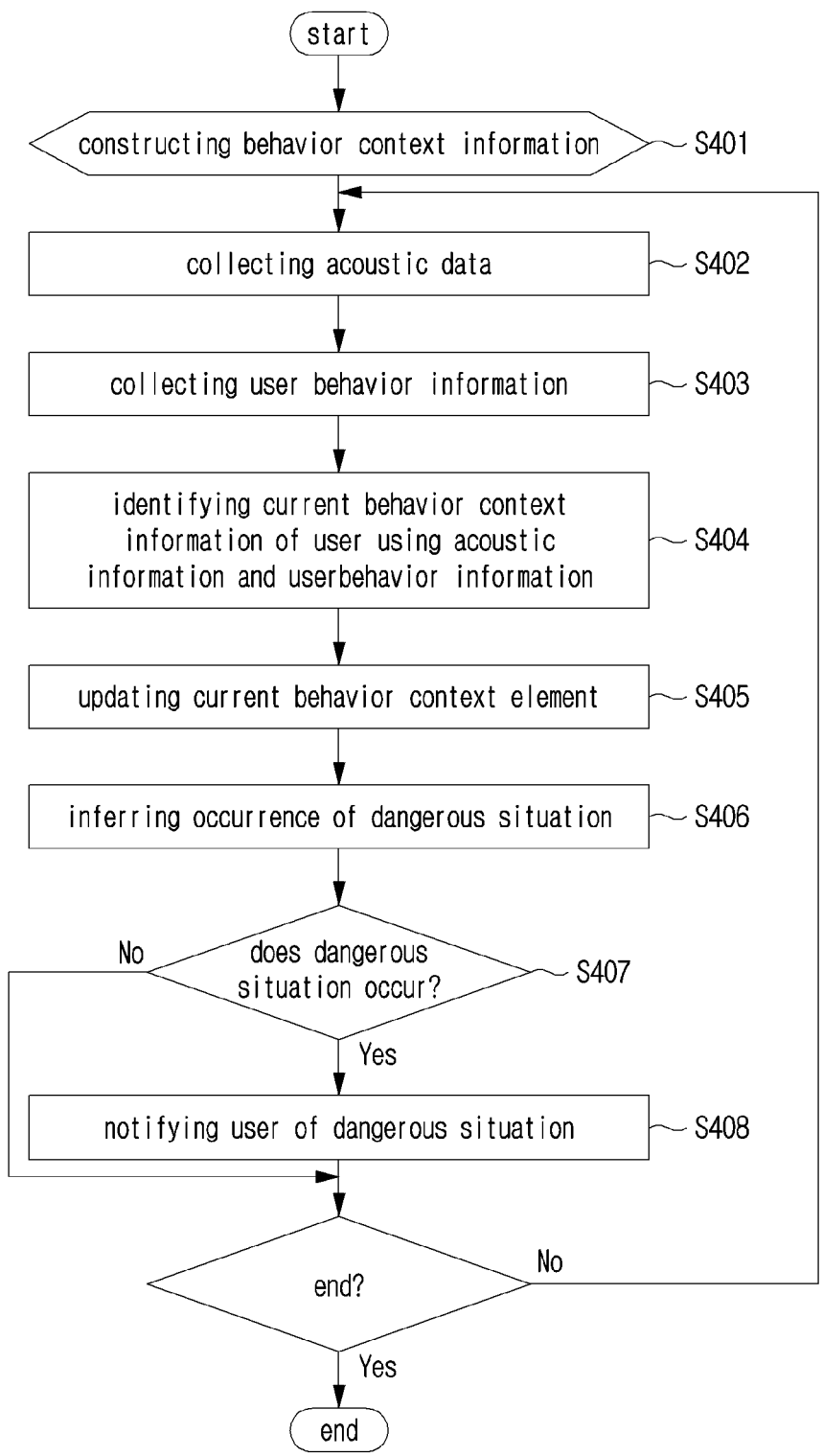
FIG. 4 is a flow chart illustrating procedures of a dangerous situation notification method according to an embodiment of the present disclosure.

FIG. 4 is a flow chart showing procedures of a dangerous situation notification method according to an embodiment of the present disclosure.

A dangerous situation notification method according to an embodiment of the present disclosure may be performed by a dangerous situation notification apparatus according to an embodiment of the present disclosure described above.

First, in step S401, a dangerous situation notification apparatus may construct behavior context information.

The behavior context information may include a behavior context element and a behavior context entity. The behavior context element may be information detected based on the meaning implied in acoustic information and user behavior information, and the behavior context entity may be information defined by a combination of behavior context elements.

Specifically, the behavior context element may represent an intention of a user implied in a specific activity performed by the user and may include information about 'why' the user performs a specific activity ('what'). Based on this, the dangerous situation notification apparatus interprets a user behavior information termed 'moving on foot' as a behavior context elements such as 'going to work', 'leaving work', and 'exercising', and the like, in consideration of the place where the person begin to walk, the semantic time related to the behavior, repetitive pattern of the same behavior, and the like, regarding the user behavior information.

In addition, the behavior context entity may be information describing the user's behavior in detail by combining a series of user behavior context elements and information such as time and place. For example, the user behavior context entity may be exemplified as 'moving on foot for lunch on weekdays', 'moving by car for exercising on a weekend morning', 'commute to work by bicycle for night duty on a weekday evening', and so on, and the user behavior context entity may include information such as date, day of the week, time of the day, transport type, location, place, speed, direction, activity, and the like, as underlying data.

Furthermore, since the behavior context element and the behavior context entity may be different for each user, the dangerous situation notification apparatus may generate and store the behavior context element and the behavior context entity for each user.

Such behavior context information may be constructed based on information continuously collected while the user uses the terminal, and may be continuously constructed and updated while a dangerous situation notification method is performed.

In step S402, the dangerous situation notification apparatus collects ambient acoustic data generated by objects around the dangerous situation notification apparatus, and acoustic information based on the collected acoustic data.

Occurrence of the dangerous situation may be related to a sound source. That is, a cause of a dangerous situation may generate certain acoustic sound, or an acoustic sound may be generated as a result of the dangerous situation. In view of this, the dangerous situation notification apparatus may be provided with at least one microphone, and the ambient acoustic data may be collected from the microphone. The dangerous situation notification apparatus may extract at least one sound source from the collected acoustic data, and determine acoustic source types on the basis of the characteristics represented by the sound sources. For example, the acoustic source types may include animal barking, gun fire, human scream, crying, a car, a bus, a truck, a motorcycle, a train, an engine acceleration, a horn, a sudden stopping sound of a vehicle, a door knock, a telephone bell, a doorbell, various warnings (alarm), a siren, and the like.

Particularly, the dangerous situation notification apparatus may calculate relative position information between at least one sound source and the dangerous situation notification apparatus, for example, relative distance information indicating a distance between at least one sound source and the dangerous situation notification apparatus, direction information indicating a direction of at least one sound source based on the orientation of dangerous situation notification apparatus, and the like.

For example, the dangerous situation notification apparatus may use geometric arrangement information of the at least two microphones, a phase difference of the acoustic signals received by the at least two microphones, a change in frequency component, and the like to calculate relative distance information, direction information, and the like.

In addition, the dangerous situation notification apparatus may generate acoustic scene information based on acoustic source types or characteristics represented by the sound source. The acoustic scene information may imply an audibly perceived location or place of the dangerous situation notification apparatus. For example, the acoustic scene information may include a bus, a city, a square, a house, a subway, an office, a residential area, a train station, and the like.

Further, the dangerous situation notification apparatus performs quality enhancement (white noise removal, sound pressure normalization, etc.) on the collected acoustic data, extracts features in the time-frequency domain, and then analyzes the extracted features, thereby detecting or classifying the acoustic source types and the acoustic scene information.

For example, the dangerous situation notification apparatus extracts Mel-frequency cepstral coefficients (MFCC) as a characteristic of an acoustic signal, and detects or classifies the acoustic source types and the acoustic scene information using a classifier, such as Bayesian, k nearest neighbor (kNN), support vector machine (SVM), hidden Markov chain model (HMM), decision tree, multi-layer perceptron neural network (MLP NN).

As another example, the dangerous situation notification apparatus learns acoustic signals with arbitrary time and frequency domain features directly through deep learning, and detects or classifies the acoustic source types and the acoustic scene information using the learned network. Herein, the deep learning is performed based on a network structure such as a deep neural network (DNN), a convolutional neural network (CNN), a recurrent neural network (RNN), a restricted Boltzmann machine (RBM), and a deep belief network I(DBM), and the like.

Although a method in which the dangerous situation notification apparatus recognizes the acoustic source type and the scene information is exemplified according to an embodiment of the present invention, the present disclosure is not limited thereto and may be variously changed.

Meanwhile, in step S403, the dangerous situation notification apparatus detects the terminal usage information of the user, the sensing information of the user terminal, the ambience information of the user terminal, and the like, and generates and collects user behavior information on the basis of at least one of the terminal usage information of the user, the sensing information of the user terminal, the ambience information of the user terminal. Herein, the 'user behavior information' is information that is sensed or measured with devices worn or carried by a user, and may include factors that are influenced by and changed with the user's behavior.

The terminal usage information of the user is information indicating the terminal operation in which a user's usage intention is reflected. The terminal usage information may be detected based on the operation of the application stored in the user terminal or the state of the input/output interface (e.g., volume level, keyboard input screen, and the like) provided in the user terminal. For example, the dangerous situation notification apparatus may determine that the user is conducting a 'phone call' when the phone application is in operation, conducting 'music playback' when the music playback application is in operation, conducting 'video playback' when the video playback application is in operation, and conducting 'searching' when the web searching application is in operation. Also, the dangerous situation notification apparatus may identify a 'screen watching' state of the user on the basis of on or off state of the display, identify a 'hearing restriction' state on the basis of whether an earphone or speaker is connected, and identify a 'typing' state on the basis of the keyboard input.

The sensing information of the user terminal may include information detected from at least one sensor provided in the dangerous situation notification apparatus or in a wearable device connected to the dangerous situation notification apparatus. The sensing information of the user terminal may include a heart rate sensor value, a motion sensor value (acceleration, angular velocity, temperature, altitude, etc.), position and movement information (GPS coordinate, indoor position coordinate, moving speed, and the like).

The ambience information of the user terminal includes location information (address, building name, store name, etc.) detected based on the geographical location information of the dangerous situation notification apparatus, weather information corresponding to the region where the dangerous situation notification apparatus is located, and the like.

The dangerous situation notification apparatus may also detect and store temporal information (e.g., date, day of the week, time of day, etc.) along with the above information, i.e., the terminal usage information of the user, the sensing information of the user terminal, the ambience information of the user terminal, and the like.

As described in step S401, the dangerous situation notification apparatus may detect a user's behavior repeatedly appearing from the acoustic information and the user behavior information, and may generate and manage a pattern of the user's behavior repeatedly appearing as a user behavior context.

In step S404, the dangerous situation notification apparatus may identify the current behavior context information of the user using the acoustic information and the user behavior information collected.

That is, the dangerous situation notification apparatus may identify the user acoustic information and the user behavior information, which are identified in real time in steps S402 and S403, respectively, and detect the behavior context element corresponding thereto. The dangerous situation notification apparatus may identify the current behavior context entity corresponding to the detected current behavior context element in real time.

In order for the dangerous situation notification apparatus to distinguish the behavior context element and the behavior context entity stored in the database from the behavior context element and the behavior context entity corresponding to the user acoustic information and the user behavior information collected in real time, the behavior context element and the behavior context entity corresponding to the user acoustic information and the user behavior information collected in real time are indicated by the current behavior context element and the current behavior context entity. In step S405, the dangerous situation notification apparatus adds the current behavior context element and the current behavior context entity previously identified to the database storing the behavior context information.

Then, in step S406, the dangerous situation notification apparatus may use the current behavior context element or the current behavior context entity of the user, to infer the occurrence of a dangerous situation.

Specifically, the dangerous situation notification apparatus may infer whether the acoustic information or the user behavior information corresponds to the dangerous situation on the basis of the current behavior context element and the current behavior context entity analyzed at the current time.

Specifically, the dangerous situation inference unit 40 may determine whether an acoustic source type input in real time corresponds to a risk factor or not on the basis of the current behavior context entity of the user. For example, if the acoustic source type correspond to a risk factor such as a siren, an alarm, a warning, a horn, and the like, the dangerous situation notification apparatus may determine that the acoustic source type has to be considered in the current behavior context element or the current behavior context entity of the user.

In addition, the dangerous situation notification apparatus may infer whether or not a dangerous situation occurs, only when the acoustic source type is suitable for the current behavior context element or the current behavior context entity of the user. For example, the dangerous situation notification apparatus may infer a dangerous situation differently according to the current behavior context element or the current behavior context entity of the user, when sensing that the acoustic source type is a fire alarm. For example, when the current behavior context element is 'commute to work', the user is more likely to pass the place, so the dangerous situation notification apparatus may infer that the situation is 'not dangerous' on the basis of the current behavior context element. On the other hand, when the current behavior context element is 'shopping', the user is likely to wander around the place or enter a building, so the dangerous situation notification apparatus may infer that the situation is 'dangerous' on the basis of the current behavior context element.

As another example, when an acoustic source type corresponds to a risk factor such as a siren, an alarm, a warning, a horn, and the like and the sound occurs continuously, the dangerous situation notification apparatus may identify the position or trajectory of the sound source and confirm the user's trajectory from the current behavior context element or the current behavior context entity of the user. The dangerous situation notification apparatus may determine whether or not a dangerous situation occurs by calculating a likelihood of the user's collision with the sound source using the locations and trajectories of the sound source and the user.

Further, the dangerous situation notification apparatus may calculate a distraction level of the user using the current behavior context element or the current behavior context entity of the user and the user behavior information, and use the distraction level as a sensitivity adjustment parameter of the dangerous situation prediction. For example, the dangerous situation notification apparatus sets the distraction level to 'normal' if the apparatus confirms that the user terminal is being moved using the sensing information of the user terminal, an earphone is connected using the sensing information of the user terminal, a music playback application is in operation using the terminal usage information of the user, and the display of the user terminal is off. If the distraction level is set to 'normal', the dangerous situation notification apparatus may use the acoustic source types of the sound sources located in the predetermined first region to determine whether or not a dangerous situation occurs. As another example, the dangerous situation notification apparatus sets the distraction level to 'high' if the apparatus confirms that the user terminal is being moved using the sensing information of the user terminal, an earphone is connected using the sensing information of the user terminal, a moving picture playback application is in operation using the terminal usage information of the user, and the display of the user terminal is on. If the distraction level is set to 'high', the dangerous situation notification apparatus may use acoustic source types of the sound sources located in the second region wider than the predetermined first region to determine whether or not a dangerous situation occurs.

The manner in which the dangerous situation notification apparatus infers a dangerous situation may be performed based on a combination of at least one rule-based logic algorithm (IF This Then That (IFTTT), ontology, etc.). As another example, the dangerous situation notification apparatus may perform inference on a dangerous situation using a predictor implemented by machine learning (DNN, CNN, RNN, RBN, DBM, etc.) using collected data for a predetermined period of time.

When the dangerous situation occurs (S407—Yes), the dangerous situation notification apparatus may notify the user of the dangerous situation through a means that may be recognized by the user, for example, warning message display such as sound, vibration, visual message, and the like (S408).

In step S408, the dangerous situation notification apparatus may notify the user of the dangerous situation in consideration of the terminal usage information of the user. For example, when the terminal usage information of the user indicates that the moving picture is being played, a voice message notifying a user of occurrence of the dangerous situation may be played, or a pop-up message notifying a user of occurrence of the dangerous situation may be output. When the terminal usage information of the user indicates that the sound source file is being played, a voice message notifying a user of occurrence of the dangerous situation may be played, or vibration of the terminal may be generated.

The above-described steps S402 to S408 may be repeatedly performed until the operation of the dangerous situation notification apparatus is ended.

Figure 5:
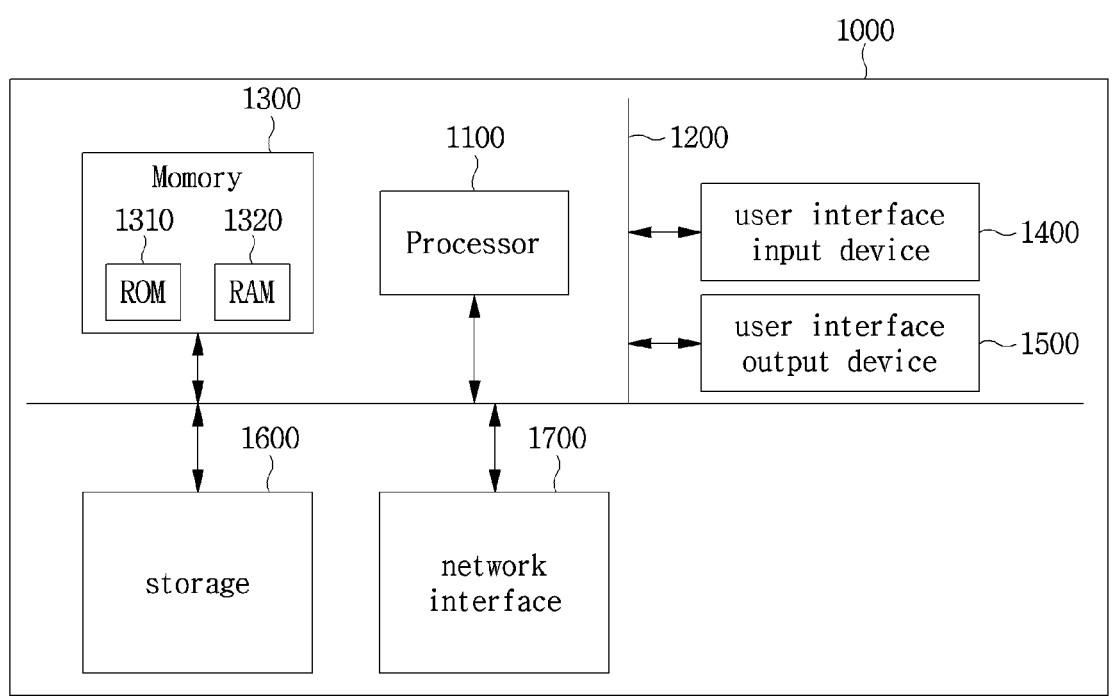
FIG. 5 is a block diagram illustrating a computing system that performs dangerous situation notification method and apparatus according to an embodiment of the present disclosure.

FIG. 5 is a block diagram illustrating a computing system that performs dangerous situation notification method and apparatus according to an embodiment of the present disclosure.

Referring to FIG. 5, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A dangerous situation notification apparatus comprising:
   an acoustic information management unit identifying and providing acoustic information including an acoustic source type and acoustic scene information;
   a user behavior information identification unit generating and providing user behavior information on the basis of at least one of terminal usage information of a user, sensing information of a user terminal, and ambience information of the user terminal;
   a behavior context information management unit storing user behavior context information generated using the acoustic information and the user behavior information in advance, and analyzing user's current behavior context information corresponding to the acoustic information and the user behavior information detected in real time on the basis of the user behavior context information stored in advance;
   a dangerous situation inference unit inferring whether the acoustic information or the user behavior information corresponds to a dangerous situation on the basis of the user's current behavior context information; and a dangerous situation notification unit providing a dangerous situation notification on the basis of a result inferred by the dangerous situation inference unit.

2. The apparatus of claim 1, wherein the behavior context information management unit includes:

a user behavior event recognition unit detecting at least one user behavior event using at least one of the acoustic information and the user behavior information; and a behavior context information generation unit generating the user behavior context information by combining the at least one user behavior event.

3. The apparatus of claim 2, wherein the user behavior context information includes semantic information inferred from a pattern in which the at least one user behavior event occurs repeatedly, periodically, or regularly.

4. The apparatus of claim 2, wherein the user behavior context information includes a behavior context element that defines the behavior of the user using rule-based reasoning based on the at least one user behavior event.

5. The apparatus of claim 4, wherein the user behavior context information includes a behavior context entity that describes the behavior of the user in detail by combining the behavior context elements.

6. The apparatus of claim 1, wherein the dangerous situation inference unit infers the dangerous situation when the acoustic source type corresponds to a risk factor and the acoustic source type is suitable for the user behavior context information.

7. The apparatus of claim 1, wherein the dangerous situation inference unit infers the dangerous situation, when the acoustic source type corresponds to a risk factor, a user's trajectory identified from the user behavior information corresponds to a origin of the sound source, and the user is estimated to collide with the origin of the sound source on the basis of the user behavior context information.

8. The apparatus of claim 6, wherein the dangerous situation inference unit infers the dangerous situation, when the acoustic source type corresponds to the risk factor, the acoustic source type is suitable for the user behavior context information, and a distance between a origin of the sound source and a user's position identified from the user behavior information is within a dangerous situation estimation range calculated based on the user behavior context information.

9. A dangerous situation notification method comprising:

identifying acoustic information including an acoustic source type and acoustic scene information;

generating user behavior information on the basis of at least one of terminal usage information of a user, sensing information of a user terminal, and ambience information of the user terminal;

generating and storing user behavior context information in advance using the acoustic information and the user behavior information;

analyzing user's current behavior context information corresponding to the acoustic information and the user behavior information detected in real time on the basis of the user behavior context information stored in advance;

inferring whether the acoustic information or the user behavior information corresponds to a dangerous situation on the basis of the user's current behavior context information; and providing a dangerous situation notification on the basis of a result inferred by the dangerous situation inference unit.

10. The method of claim 9, wherein the analyzing of the user's current behavior context information includes:

detecting at least one user behavior event using at least one of the acoustic information and the user behavior information; and identifying the current behavior context information by combining the at least one user behavior event.

11. The method of claim 9, wherein the user behavior context information includes semantic information inferred from a pattern in which the at least one user behavior event occurs repeatedly, periodically, or regularly.

12. The method of claim 9, wherein the user behavior context information includes a behavior context element that defines a behavior of the user using rule-based reasoning based on the at least one user behavior event.

13. The method of claim 12, wherein the user behavior context information includes a behavior context entity that describes the behavior of the user in detail by combining the behavior context elements.

14. The method of claim 9, wherein the inferring of whether the acoustic information or the user behavior information corresponds to the dangerous situation is performed by inferring the dangerous situation, when the acoustic information corresponds to a risk factor and the acoustic information is suitable for the user's current behavior context information.

15. The method of claim 14, wherein the inferring of whether the acoustic information or the user behavior information corresponds to the dangerous situation is performed by inferring the dangerous situation, when the acoustic source type corresponds to the risk factor, the acoustic source type is suitable for the user behavior context information, and a distance between the origin of the sound source and a user's position identified from the user behavior information is within a dangerous situation estimation range calculated based on the user's current behavior context information.

16. The method of claim 9, wherein the inferring of whether the acoustic information or the user behavior information corresponds to the dangerous situation is performed by inferring the dangerous situation, when the acoustic source type corresponds to a risk factor, a user's trajectory identified from the user behavior information corresponds to a origin of the sound source, and the user is estimated to collide with the origin of the sound source on the basis of the user behavior context information.

* * * * *